Sept. 1, 1964     R. LEMAITRE     3,147,192
NUCLEAR FUEL RODS
Filed Jan. 22, 1960
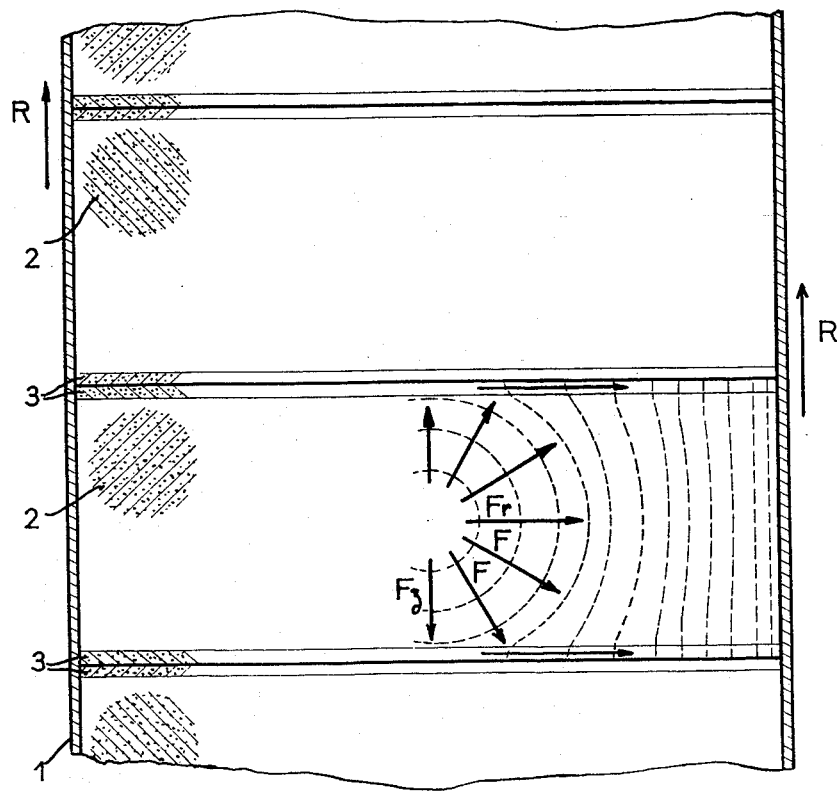
INVENTOR
RENE LEMAITRE
BY Irvin S. Thompson
ATTY.

United States Patent Office 3,147,192
Patented Sept. 1, 1964

---

3,147,192
NUCLEAR FUEL RODS
René Lemaitre, Colombes, France, assignor to Societe
Indatom, Paris, France, a corporation of France
Filed Jan. 22, 1960, Ser. No. 4,021
Claims priority, application France Jan. 27, 1959
6 Claims. (Cl. 176—72)

The present invention relates to nuclear fuel rods obtained by the stacking of a series of cylindrical tablets or pellets composed of a nuclearly combustible material. These rods are formed within a metallic sheath, usually composed of inoxidable steel, an alloy of zirconium or beryllium, and the combustible material more commonly employed at the present time is uranium oxide.

Uranium oxide, by reason of its very great mechanical and chemical stability at the temperature concerned, its comparatively low percentage of oxygen and the small pick-up section of the latter constitutes an excellent nuclearly combustible material. Unfortunately, the thermal conductivity of this oxide is very low and furthermore decreases appreciably with an increase in the temperature. In consequence, despite its high melting temperature (2700° C.), the specific thermal power, i.e., the number of watts per cubic centimetre of oxide emanating from the fission, is rapidly limited by the melting at the centre of the oxide tablets.

In considering the melting at the centre or on a given relative radius of the tablets as a limitation it is possible to increase the specific thermal power only by a decrease in the diameter of the tablets. Now it is obvious that the division of the oxide into very small rods causes a serious loss of reactivity because of the difficulty in reducing the thickness of the sheath. The increased cost price of the sheath represents a further limiting factor.

The present invention has for its object an improvement in the thermal conductivity of fuel rods of the kind in question, and the means proposed for this purpose reside essentially in the addition to the nuclearly combustible material of a material which is a good conductor of heat.

The conductive material employed according to the invention is preferably an oxide selected from among magnesium, beryllium and aluminum oxides. These oxides have the advantage of a high melting point, a low pick-up section, and a considerable thermal conductivity, particularly at high temperatures.

It is possible to consider a homogeneous mixture of fissile oxide with the conductive oxide. Unfortunately, in this case, it is not the specific conductivity of the materials which is additive, taking into account the relative volumes of these materials, but their resistability, i.e., the reverse of the specific conductivity, as may readily be seen by analogy by considering the transparency of a mixture of two liquids, one opaque and the other transparent.

According to a preferred embodiment of the invention, the addition of the material which is a good conductor of heat is effected in the form of a partitioning of the rod by means of a series of thin tablets.

The fuel rods being obtained by the stacking of small tablets, this being in order to be able to obtain a dense oxide, one form of embodiment of the invention consists in applying to the flat face of these tablets a thin layer of conductive oxide.

The tablets having comparatively little thickness, the flow of heat tends to be oriented axially in the direction of the partitions of conductive oxide, to be thereupon canalised thereby in a radial direction. The conductivity of the whole will thus vary in a substantially linear fashion with the percentage by volume of the participating oxides, the conductive oxides intervening to an extent substantially proportional to their relative volume and to their conductivity proper, which is of the order of 10 times that of the combustible oxide.

The accompanying drawing illustrates diagrammatically a portion of a fuel rod according to the invention.

This rod is formed by stacking within the interior of a sheath 1 composed, for example, of inoxidable steel, cylindrical tablets 2 composed of uranium oxide having a diameter of approximately fourteen millimetres and a thickness $e_1$ of five millimetres. Each of these tablets is coated on each of its two flat faces with a layer or thin tablet 3 having a thickness $e_2$ of a quarter of a millimetre and composed of beryllium oxide.

To obtain composite tablets thus formed it is possible with advantage to produce on the one hand by means of a first compression tablets 2 composed of pulverulent uranium oxide and on the other hand thin tablets 3 composed of pulverulent beryllium oxide, and then in a second, final compressing operation to ensure intimate assembly of each tablet 2 composed of uranium oxide with two thin tablets 3 of beryllium oxide. The composite tablets thus formed are thereupon stacked in the sheath 1 according to the method usually employed for stacking simple combustible tablets.

It is known that the thermal conductivities of uranium oxide ($UO_2$) and beryllium oxide (BeO) decrease upon an increase in the temperature up to towards 1700° C., but maintain between themselves a substantially constant ratio, the conductivity of the beryllium oxide remaining greater than that of the uranium oxide in a ratio of the order of ten. It may be determined in these circumstances that when, under the effect of a flow of neutrons, a certain quantity of heat is released per unit of volume of the nuclearly combustible material of the tablets 2, whilst a flow of refrigerating fluid represented diagrammatically by the arrows R maintains the sheath at a given constant temperature, the calorific current in the fissile material of each tablet of a rod according to the invention is organised in the manner indicated diagrammatically in the drawing in the right hand half of one of the tablets. In this illustration the broken lines show the direction of the lines of equal temperature, and the arrows F in full lines are the vectors of the calorific current. There is to be found in particular the existence of a component Fz of axial flow of particular extent proceeding from the central zone of each combustible tablet in the direction of each of two adjacent conductive tablets, this axial flow becoming predominant on the purely radial flow represented by the arrow F$r$.

The practical result of this organisation of the calorific flow consists in the fact that it becomes possible to increase in considerable proportions the specific thermal power, and consequently the total power adapted to be extracted from a reactor in respect of a given volume of fissile material and a fixed limited value at the admissible temperature at the centre of each tablet. Thus, in the case of the particular example considered in the above, the gain in power obtained may be rated at 43%. As against this gain of power there is to be noted a certain reduction of the effective energy capable of being employed in respect of a given rate of use of the fuel in consequence of the absorption of neutrons in the partitioning layers constituted by the conductive tablets. The innovation remains in any case largely beneficial from the point of view of the financial yield of the installation.

It will be understood that the invention is not limited to the particular details of the form of embodiment described above, which has been selected solely by way of example and which, on the contrary, may form the subject matter of numerous and various modifications without departing from the scope of the present invention. Thus, for example, the fissile material employed, apart from plutonium oxide, may also be a mixture of plutonium oxide and uranium oxide, or the like. It may comprise a fertile material. The rods may comprise an inert core of any desired form and the tablets of conductive material may take the form of the inner annular surface of their tablets, and so forth. When the nuclearly active material comprises a plurality of fissile or fertile oxides, for example uranium oxide, plutonium oxide and thorium oxide, or two only of these three, they may with advantage be formed of thin tablets each comprising one only of the said oxides. An internal stratification of this nature of the combustible tablets themselves enables the greatest benefit to be derived from the differences between the thermal conductivity of the different oxides. The partitions of conductive material may be incorporated on the other hand within the volume of each tablet of fissile material with a profile of desired kind and/or have a variable thickness, and so forth.

I claim:

1. A nuclear fuel rod comprising a series of cylindrical tablets including at least one fissile fuel material and partitions within said tablets and in intimate contact therewith consisting of thin layers of non-fissile material which is a better conductor of heat than said fuel material, the height of said tablets being substantially smaller than their diameter so that the flow of heat thereof tends to be oriented axially in the direction of said partitions and the mean thickness of said partitions being less than a fifth of the height of said tablets.

2. Nuclear fuel rod according to claim 1 in which said fissile fuel material is selected from the group consisting of uranium oxide, plutonium oxide, thorium oxide and combinations thereof.

3. Nuclear fuel rod according to claim 1 in which said non-fissile material is selected from the group consisting of the oxides of aluminum, magnesium and beryllium.

4. Nuclear fuel rod comprising an elongated sheathing, a series of cylindrical members composed of poor heat-conducting fissile material disposed within said elongated sheathing, and a better heat-conducting non-fissile material in the form of a transverse partition in intimate contact with the top and bottom surfaces of each cylindrical member, the height of each cylindrical member being smaller than the diameter thereof so that the flow of heat thereof tends to be oriented axially in the direction of the better heat-conducting non-fissile material, the non-fissile material on each surface of each cylindrical member having a thickness which is less than one-fifth of the height of each cylindrical member.

5. Nuclear fuel rod according to claim 4 in which said fissile material contains uranium oxide.

6. Nuclear fuel rod according to claim 4 in which said non-fissile material is beryllium oxide.

References Cited in the file of this patent

UNITED STATES PATENTS

| | | |
|---|---|---|
| 2,890,158 | Ohlinger et al. | June 9, 1959 |
| 2,952,603 | Boller et al. | Sept. 13, 1960 |
| 2,975,114 | Allison | Mar. 14, 1961 |
| 2,978,398 | Metcalf et al. | Apr. 4, 1961 |
| 3,000,803 | Morris et al. | Sept. 19, 1961 |
| 3,049,486 | Currier et al. | Aug. 14, 1962 |